(12) United States Patent
Garland et al.

(10) Patent No.: US 8,661,226 B2
(45) Date of Patent: *Feb. 25, 2014

(54) SYSTEM, METHOD, AND COMPUTER PROGRAM PRODUCT FOR PERFORMING A SCAN OPERATION ON A SEQUENCE OF SINGLE-BIT VALUES USING A PARALLEL PROCESSOR ARCHITECTURE

(75) Inventors: Michael J. Garland, Lake Elmo, MN (US); Samuli M. Laine, Vantaa (FI); Timo O. Aila, Tuusula (FI); David Patrick Luebke, Charlottesville, VA (US)

(73) Assignee: NVIDIA Corporation, Santa Clara, CA (US)

(*) Notice: Subject to any disclaimer, the term of this patent is extended or adjusted under 35 U.S.C. 154(b) by 1315 days.

This patent is subject to a terminal disclaimer.

(21) Appl. No.: 11/940,782

(22) Filed: Nov. 15, 2007

(65) Prior Publication Data

US 2009/0132878 A1    May 21, 2009

(51) Int. Cl.
*G06F 15/00* (2006.01)
*G06F 15/76* (2006.01)

(52) U.S. Cl.
USPC .......................................................... 712/10

(58) Field of Classification Search
USPC ........................................................ 712/220
See application file for complete search history.

(56) References Cited

U.S. PATENT DOCUMENTS

| | | |
|---|---|---|
| 4,628,483 A | 12/1986 | Nelson |
| 4,855,937 A | 8/1989 | Heartz |
| 5,193,207 A | 3/1993 | Vander Vegt et al. |
| 5,274,718 A | 12/1993 | Leonardi et al. |
| 5,594,844 A | 1/1997 | Sakai et al. |
| 5,621,908 A | 4/1997 | Akaboshi et al. |
| 5,650,862 A | 7/1997 | Shimizu et al. |
| 5,793,379 A * | 8/1998 | Lapidous ...................... 345/606 |
| 5,963,212 A | 10/1999 | Bakalash |
| 6,065,005 A | 5/2000 | Gal et al. |
| 6,489,955 B1 | 12/2002 | Newhall, Jr. |
| 6,518,971 B1 | 2/2003 | Pesto, Jr. et al. |
| 6,549,907 B1 | 4/2003 | Fayyad et al. |
| 6,556,200 B1 | 4/2003 | Pfister et al. |
| 6,633,882 B1 | 10/2003 | Fayyad et al. |
| 6,738,518 B1 | 5/2004 | Minka et al. |

(Continued)

FOREIGN PATENT DOCUMENTS

| | | |
|---|---|---|
| WO | 2007082042 A2 | 7/2007 |
| WO | 2008127610 A3 | 10/2008 |
| WO | 2008127622 A3 | 10/2008 |
| WO | 2008127623 A3 | 10/2008 |

OTHER PUBLICATIONS

Hillis et al.; Data Parallel Algorithms; Dec. 1986; Communications of the ACM.*
Harris; Parallel Prefix Sum (Scan) with CUDA; Apr. 2007; NVidia.*

(Continued)

*Primary Examiner* — Corey S Faherty
(74) *Attorney, Agent, or Firm* — Zilka-Kotab, PC

(57) ABSTRACT

A system, method, and computer program product are provided for performing a scan operation on a sequence of single-bit values using a parallel processing architecture. In operation, a scan operation instruction is received. Additionally, in response to the scan operation instruction, a scan operation is performed on a sequence of single-bit values using a parallel processor architecture with a plurality of processing elements.

22 Claims, 7 Drawing Sheets

(56) References Cited

U.S. PATENT DOCUMENTS

| | | |
|---|---|---|
| 6,825,839 B2 | 11/2004 | Huang et al. |
| 6,879,980 B1 | 4/2005 | Kothuri et al. |
| 7,146,486 B1 | 12/2006 | Prokopenko et al. |
| 7,194,125 B2 | 3/2007 | Vlasic et al. |
| 7,348,975 B2 | 3/2008 | Reshetov et al. |
| 7,580,927 B1 | 8/2009 | Abugov et al. |
| 7,616,782 B2 | 11/2009 | Badawy |
| 7,903,125 B1 | 3/2011 | Ayers et al. |
| 8,065,288 B1 | 11/2011 | Garland et al. |
| 8,243,083 B1 | 8/2012 | Garland et al. |
| 8,264,484 B1 | 9/2012 | Lauterbach et al. |
| 8,284,188 B1 | 10/2012 | Lauterbach et al. |
| 8,321,492 B1 | 11/2012 | Sengupta et al. |
| 2003/0028509 A1 | 2/2003 | Sah et al. |
| 2004/0210596 A1 | 10/2004 | Budd et al. |
| 2005/0001844 A1 | 1/2005 | Naegle |
| 2005/0177564 A1 | 8/2005 | Kobayashi et al. |
| 2007/0106989 A1 | 5/2007 | Kissell |
| 2007/0159488 A1 | 7/2007 | Danskin et al. |
| 2007/0165035 A1 | 7/2007 | Duluk et al. |
| 2007/0169042 A1 | 7/2007 | Janczewski |
| 2007/0182732 A1 | 8/2007 | Woop et al. |
| 2007/0260663 A1 | 11/2007 | Frigo et al. |
| 2007/0264023 A1 | 11/2007 | Gorrell et al. |
| 2008/0005547 A1 | 1/2008 | Papakipos et al. |
| 2008/0043018 A1 | 2/2008 | Keller et al. |
| 2008/0316214 A1 | 12/2008 | Peeper |
| 2009/0089542 A1* | 4/2009 | Laine et al. ............... 712/30 |
| 2009/0106530 A1 | 4/2009 | Lauterbach et al. |
| 2010/0076941 A1 | 3/2010 | Dotsenko et al. |

OTHER PUBLICATIONS

U.S. Appl. No. 11/942,608, filed Nov. 19, 2007.

G. Blelloch, 1990. *Vector Models for Data-Parallel Computing*. MIT Press, ISBN 0-262-02313-X, 1990. http://www.cs.cmu.edu/~guyb/papers/Ble90.pdf.

Thinking Machines Corp., 1990. *Connection Machine Model CM-2 Technical Summary*. Version 6.0, Nov. 1990.

U.S. Appl. No. 11/862,938, filed Sep. 27, 2007.

D. Naishlos, J. Nuzman, C.-W. Tseng, and U. Vishkin, 2001, Towards a first vertical prototyping of an extremely fine-grained parallel programming approach. In *Proc. 13th ACM Symposium on Parallel Algorithms and Architecture (SPAA 01)*, Jul. 2001. http://www.umiacs.umd.edu/users/vishkin/XMT/spaa01.pdf.

Popov et al,, "Stackless KD-Tree Traversal fbr High Performance GPU Ray Tracing," Eurographics 2007, vol. 26 (2007), No. 3.

Sengupta et al., "Scan Primitives for GPU Computing," Proceedings of Graphics Hardware 2007, San Diego, CA, Aug. 4-5, 2007.

Harris et al., "Parallel Prefix Sum Scan with CUDA," to appear in *GPU Gems 3*, Hubert Nguyen, ed., Addison-Wesley, 2007.

Blelloch, "Prefix Sums and Their Applications," Carnegie Mellon University School of Computer Science, Technical Report CMU-CS-90-190, Nov. 1990.

Horn et al., "Interactive k-D Tree GPU Raytracing," graphics.stanford.edu/papers/i3dkdtree/i3dkdtreeonline.ppt.

U.S. Appl. No. 11/874,093, filed Oct. 17, 2007.

U.S. Appl. No. 11/938,091, filed Nov. 9, 2007.

Johannes Günther, Stefan Popov, Hans-Peter Seidel, and Philipp Slusallek. "Realtime Ray Tracing on GPU with BVH-based Packet Traversal." Proceedings of the IEEE/Eurographics Symposium on Interactive Ray Tracing 2007, pp. 113-118. http://www.mpi-inf.mpg.de/~guenther/BVHonGPU/BVHonGPU.pdf.

U.S. Appl. No. 11/940,782, filed Nov. 15, 2007.

U.S. Appl. No. 11/927,099, filed Oct. 29, 2007.

V. Havran and J. Bittner. "Efficient sorting and searching in rendering algorithms." *Eurographics 2006 Tutorials*, Tutorial T4, Aug. 2006, http://moon.felk.cvut.cz/~havran/eg2006tut/tut4eg06.pdf.

I. Kamel and C. Faloutsos. "On Packing R-trees." In *Proc. 2nd Int'l Conf. on Information & Knowledge Management*, Nov. 1993.

C. Wächter and A. Keller. "Instant Ray Tracing: The Bounding Interval Hierarchy," In *Proc. Eurographics Symposium on Rendering Techniques*, Apr. 2006.

V. Pascueci and R. Frank. "Global Static Indexing for Real-time Exploration of Very Large Regular Grids." In *Proc. Supercomputing 2001*, Nov. 2001.

S.-E. Yoon, P. Lindstrom, V. Pascucci, and D. Manocha. "Cache-oblivious mesh layouts," *ACM Transactions on Graphics*, Proc. SIGGRAPH 2005, 24(3), Jul. 2005.

V. Havran. "*Heuristic Ray Shooting Algorithms*." Ph.D. thesis, Czech Technical University, Nov. 2000.

Ingo Wald. *Realtime Ray Tracing and Interactive Global Illumination*. Ph.D. dissertation, Universität des Saarlandes, 2004. http://www.sci.utah.edu/~wald/Publications/2004/WaldPhD/download/phd.pdf.

Non-Final Office Action from U.S. Appl. No. 12/333,244, dated Jun. 1, 2012.

Notice of Allowance from U.S. Appl. No. 12/333,255, dated Apr. 11, 2012.

Notice of Allowance from U.S. Appl. No. 11/927,159, dated May 10, 2012.

Notice of Allowance from U.S. Appl. No. 11/927,099, dated Jun. 27, 2012.

Office Action from Taiwan Patent Application No. 097143617, dated Jul. 16, 2012.

Office Action from Chinese Patent Application No. 200810172720.0, dated Sep. 23, 2011.

Non-Final Office Action from U.S. Appl. No. 11/950,245, dated Oct. 9, 2012.

Notice of Allowance from U.S. Appl. No. 12/333,244, dated Aug. 23, 2012.

Arvo, J. et al., "Fast Ray Tracing by Ray Classification," Computer Graphics, SIGRAPH '87, Jul. 27-31, 1987, pp. 55-64, vol. 21, No. 4, ACM, Anaheim, CA, USA.

Gottschalk, S. et al., "OBBTree: A Hierarchical Structure for Rapid Interference Detection," Proceedings of the 23rd Annual Conference on Computer Graphics and Interactive Techniques, 1996, pp. 171-180, vol. 30, ACM, New York, NY, USA.

Miyashita, K. et al., "An Algorithm for Computing Prefix Sum on a Reconfigurable Array," Academic Journal, Transactions of the Institute of Electronics, Information and Communication Engineers (IEICE) D-I, Oct. 25, 1994, pp. 703-711, vol. J77-D-I, No. 10, Japan.

Roger, D. et al., "Whitted Ray-Tracing for Dynamic Scenes using a Ray-Space Hierarchy on the GPU," Proceedings of the Eurographics Symposium on Rendering, The Eurographics Association, Jun. 2007, pp. 99-110.

Sato, K. et al., "Implementing the PRAM Algorithms in the Multithread Architecture and Evaluating the Performance," Information Processing Society of Japan (IPSJ), SIG Notes '98 (28), Mar. 20, 1998, pp. 39-46, Japan, Abstract Translation Only.

Wald, I. et al., "Interactive Rendering with Coherent Ray Tracing," EUROGRAPHICS 2001, 2001, pp. 153-164, vol. 20, No. 3, The Eurographics Association and Blackwell Publishers, UK and USA.

Wald, I., "On Fast Construction of SAH-based Bounding Volume Hierarchies," IEEE Symposium on Interactive Ray Tracing, 2007, pp. 33-40, RT 2007, IEEE Computer Society, Washington DC, USA.

Wald, I. et al., "SIMD Ray Stream Tracing—SIMD Ray Traversal with Generalized Ray Packets and On-the-fly Re-Ordering-," SCI Institute Technical Report No. UUSCI-2007-012, Aug. 2, 2007, USA.

Zagha, M. et al., "Radix Sort for Vector Multiprocessors," Proceedings of the 1991 ACM/IEEE Conference on Supercomputing, Nov. 1991, pp. 712-721, ACM, New York, NY.

Chinese Office Action from Application No. 200810172720.0 dated Jun. 25, 2010.

German Office Action from Application No. 10-2008-031998.8-53 dated Mar. 9, 2010.

Notice of Reasons for Rejection from Japanese Patent Application No. 2008-263158 dated Jun. 8, 2010.

Notice of Preliminary Rejection from Korean Patent Application No. 10-2008-0113250 dated May 28, 2010.

Notice of Preliminary Rejection from Korean Patent Application No. 10-2008-0094936 dated Feb. 26, 2010.

(56) References Cited

OTHER PUBLICATIONS

Notice of Preliminary Rejection from Korean Patent Application No. 10-2008-0113250 dated Dec. 17, 2010.
Chinese Office Action from Application No. 200810145892.9 dated Apr. 15, 2010.
Final Office Action from U.S. Appl. No. 11/862,938 dated Jun. 9, 2010.
Final Office Action from U.S. Appl. No. 11/938,091 dated Oct. 14, 2010.
Final Office Action from U.S. Appl. No. 11/942,608 dated May 10, 2010.
Non-Final Office Action from U.S. Appl. No. 11/862,938 dated Dec. 1, 2009.
Advisory Action from U.S. Appl. No. 11/862,938 dated Aug. 23, 2010.
Non-Final Office Action from U.S. Appl. No. 11/927,159 dated Sep. 17, 2010.
Non-Final Office Action from U.S. Appl. No. 11/927,099 dated Oct. 4, 2010.
Non-Final Office Action from U.S. Appl. No. 11/942,608 dated Nov. 4, 2010.
Non-Final Office Action from U.S. Appl. No. 11/942,608 dated Dec. 18, 2009.
Non-Final Office Action from U.S. Appl. No. 11/938,091 dated Mar. 2, 2010.
Non-Final Office Action from U.S. Appl. No. 11/950,193 dated Feb. 3, 2011.
U.S. Appl. No. 11/927,159, filed Oct. 29, 2007.
U.S. Appl. No. 11/950,193, filed Dec. 4, 2007.
Notice of Final Rejection from Japanese Patent Application No. 2008-263158 dated Nov. 16, 2010.
Final Office Action from U.S. Appl. No. 11/950,245, dated Apr. 25, 2013.
Chinese Office Action from Application No. 200810172720.0 dated Apr. 8, 2011.
Final Office Action from U.S. Appl. No. 11/927,099 mailed Jun. 1, 2011.
Final Office Action from U.S. Appl. No. 11/927,159 mailed May 26, 2011.
Final Office Action from U.S. Appl. No. 11/942,608 mailed Apr. 29, 2011.
Final Office Action from U.S. Appl. No. 11/950,245 dated May 25, 2011.
Non-Final Office Action from U.S. Appl. No. 11/950,245 dated Oct. 5, 2010.
U.S. Appl. No. 11/950,245, filed Dec. 4, 2007.
U.S. Appl. No. 12/333,244, filed Dec. 11, 2008.
U.S. Appl. No. 12/333,255, filed Dec. 11, 2008.
Blelloch, G. E., "Programming Parallel Algorithms," Communications of the ACM, Mar. 1996, vol. 39, No. 3, pp. 85-97.
Blelloch et al., "Implementation of a Portable Nested Data-Parallel Language," Journal of Parallel and Distributed Computing, Apr. 1994, 21(1), pp. 4-14.
Chatterjee, S. et al., "Scan Primitives for Vector Computers," Proceedings of Supercomputing '90, Nov. 12-16, 1990, pp. 666-675.
Dotsenko, Y. et al., "Fast Scan Algorithms on Graphics Processors," International Conference on Supercomputing, Jun. 7-12, 2008, pp. 205-213.
Gibbons, P. B., "A More Practical Pram Model," ACM Symposium on Parallel Algorithms and Architectures—SPAA, 1989, pp. 158-168.
Hensley, J. et al., "Fast Summed-Area Table Generation and it's Applications," EUROGRAPHICS 2005, 2005, vol. 24, No. 3, pp. 1-9.
Horn, D., "Stream Reduction Operations for GPGPU Applications," GPU Gems 2: Programming Techniques for High-Performance Graphics and General-Purpose Computation, Chapter 36, Second Printing, Apr. 2005, retrieved from http://http.developer.nvidia.com/GPUGenns2/gpugenris2_chapter36.html on Jul. 12, 2011, pp. 1-11.
Iverson, K. E., "A Programming Language," John Wiley & Sons, Fourth Printing, May 1967, pp. vii-xxi and 1-286.
Lindholm, E. et al., "NVIDIA Tesla: A Unified Graphics and Computing Architecture," IEEE Micro, Mar.-Apr. 2008, pp. 39-55.
Nickolls, J. et al., "Scalable Parallel Programming with CUDA," ACM Queue, Mar.-Apr. 2008, pp. 42-53.
NVIDIA Corporation, "NVIDIA CUDA Programming Guide," Nov. 29, 2007, Version 1.1, pp. ii-xiii and 1-128.
Reshetov et al., "Multi-Level Ray Tracing Algorithm," ACM Transactions on Graphics (TOG)-Proceedings of ACM SIGGRAPH 2005, Jul. 2005, vol. 24, Issue 3, pp. 1176-1185, New York, NY.
Schwartz, J. T., "Ultracomputers," ACM Transactions on Programming Languages and Systems, Oct. 1980, vol. 2, No. 4, pp. 484-521.
Sengupta, S. et al., "A Work-Efficient Step-Efficient Prefix Sum Algorithm," Proceedings of the Workshop on Edge Computing Using New Commodity Architectures, 2006, pp. 1-2.
Sengupta, S. et al., "Data-Parallel GPU Computing," May 31, 2008, pp. 1-28.
Stratton, J. A. et al., "MCUDA: An Efficient Implementation of CUDA Kernals on Multi-Cores," IMPACT Technical Report, IMPACT-08-01, Mar. 12, 2008, pp. 1-18.
Examiner's Answer from U.S. Appl. No. 11/862,938 dated Aug. 17, 2011.
Non-Final Office Action from U.S. Appl. No. 12/333,255 dated Oct. 11, 2011.
Advisory Action from U.S. Appl. No. 11/950,193 dated Oct. 3, 2011.
Final Office Action from U.S. Appl. No. 11/950,193 dated Jul. 22, 2011.
Notice of Allowance from U.S. Appl. No. 11/938,091 dated Aug. 24, 2011.
Advisory Action from U.S. Appl. No. 11/950,245 dated Aug. 16, 2011.
Advisory Action from U.S. Appl. No. 11/942,608 dated Jul. 18, 2011.
Final Office Action from U.S. Appl. No. 11/942,608, dated Nov. 18, 2013.
Notice of Allowance from U.S. Appl. No. 11/950,193, dated Dec. 19, 2013.
Non-Final Office Action from U.S. Appl. No. 11/950,245, dated Sep. 26, 2013.

* cited by examiner

SYSTEM, METHOD, AND COMPUTER PROGRAM PRODUCT FOR PERFORMING A SCAN OPERATION ON A SEQUENCE OF SINGLE-BIT VALUES USING A PARALLEL PROCESSOR ARCHITECTURE

FIELD OF THE INVENTION

The present invention relates to scan operations, and more particularly to performing scan operations using a parallel processing architecture.

BACKGROUND

Parallel processor architectures are commonly used to perform a wide array of different computational algorithms. An example of an algorithm that, is commonly performed using such architectures is a scan operation (e.g. "all-prefix-sums" operation, etc.). One such scan operation is defined in Table 1.

TABLE 1

$[1, a_0, (a_0 \oplus a_1), \ldots, (a_0 \oplus a_1 \oplus \ldots \oplus a_{n-1})]$, Specifically, given an array $[a_0, a_1, \ldots, a_{n-1}]$ and an operator "$\oplus$" for which "I" is an identity element, the array of Table 1 is returned. For example, if the operator "$\oplus$" is an addition operator, performing the scan operation on the array [3 1 7 0 4 1 6 3] would return [0 3 4 11 11 15 16 22], and so forth. While an addition operator is set forth in the above example, such operator may be any associative operator of two operands.

Furthermore, the scan operation may be an exclusive scan operation (as shown, in Table 1) or an inclusive scan operation. The exclusive scan refers to a scan where each element j of a result is the sum of all elements up to, but not including element j in an input array. On the other hand, in an inclusive scan, all elements including element j are summed.

To date, there is a continued to need to more efficiently perform computational algorithms such as scan operations using parallel processor architectures.

SUMMARY

A system, method, and computer program product are provided for performing a scan operation on a sequence of single-bit values using a parallel processing architecture. In operation, a scan operation instruction is received. Additionally, in response to the scan operation instruction, a scan operation is performed on a sequence of single-bit values using a parallel processor architecture with a plurality of processing elements.

DETAILED DESCRIPTION

Figure 1:
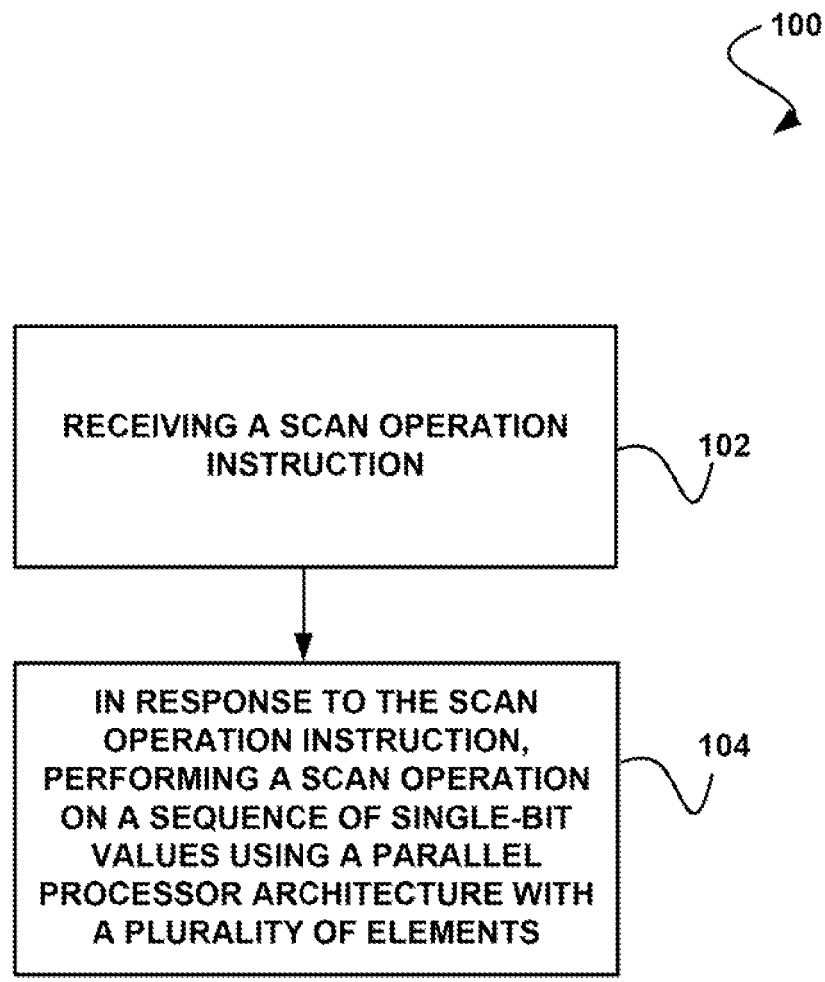
FIG. 1 shows a method for performing a scan operation on a sequence of single-bit values using a parallel processing architecture, in accordance with one embodiment of the present invention.

FIG. 1 shows a method 100 for performing a scan operation on single-bit values using a parallel processing architecture, in accordance with one embodiment of the present invention. As shown, a scan operation instruction is received. See operation 102. In the context of the present description, a scan operation instruction refers to any instruction or command corresponding to a scan operation.

Additionally, in response to the scan operation instruction, a scan operation is performed on a sequence of single-bit values using a parallel processor architecture with a plurality of processing elements. See operation 104. In the context of the present description, processing elements refer to any component of the parallel processor architecture. Additionally, the sequence of single-bit valises may include any sequence of one-bit values. By this design, computational algorithms such as scan operations on single-bit inputs may be more efficiently performed, in some embodiments.

Furthermore, in the context of the present description, the scan operation may refer to any operation that involves a current element and at least one previous element of an array. For example, in various embodiments, the scan operation may include a prefix sum scan operation, an exclusive scan operation, an inclusive scan operation, and/or any other scan operation (e.g. involving more or less elements and/or other operators, etc.).

Still yet, in the context of the present description, the parallel processor architecture may include any architecture that includes two or more processing elements that operate in parallel. In one embodiment, such parallel processor architecture may take the form of a graphics processor [e.g. graphics processing unit (GPU), etc.], or any other integrated circuit, equipped with graphics processing capabilities (e.g. in the form of a chipset, system-on-chip (SOC), core integrated with a CPU, discrete processor, etc.). In still another embodiment, the foregoing parallel processing architecture may include a vector processor.

More illustrative information will now be set forth regarding various optional architectures and features with which the foregoing framework may or may not be implemented, per the desires of the user. It should he strongly noted that the following information is set forth for illustrative purposes and should not be construed as limiting in any manner. Any of the following features may he optionally incorporated with or without the exclusion of other features described.

Figure 2:
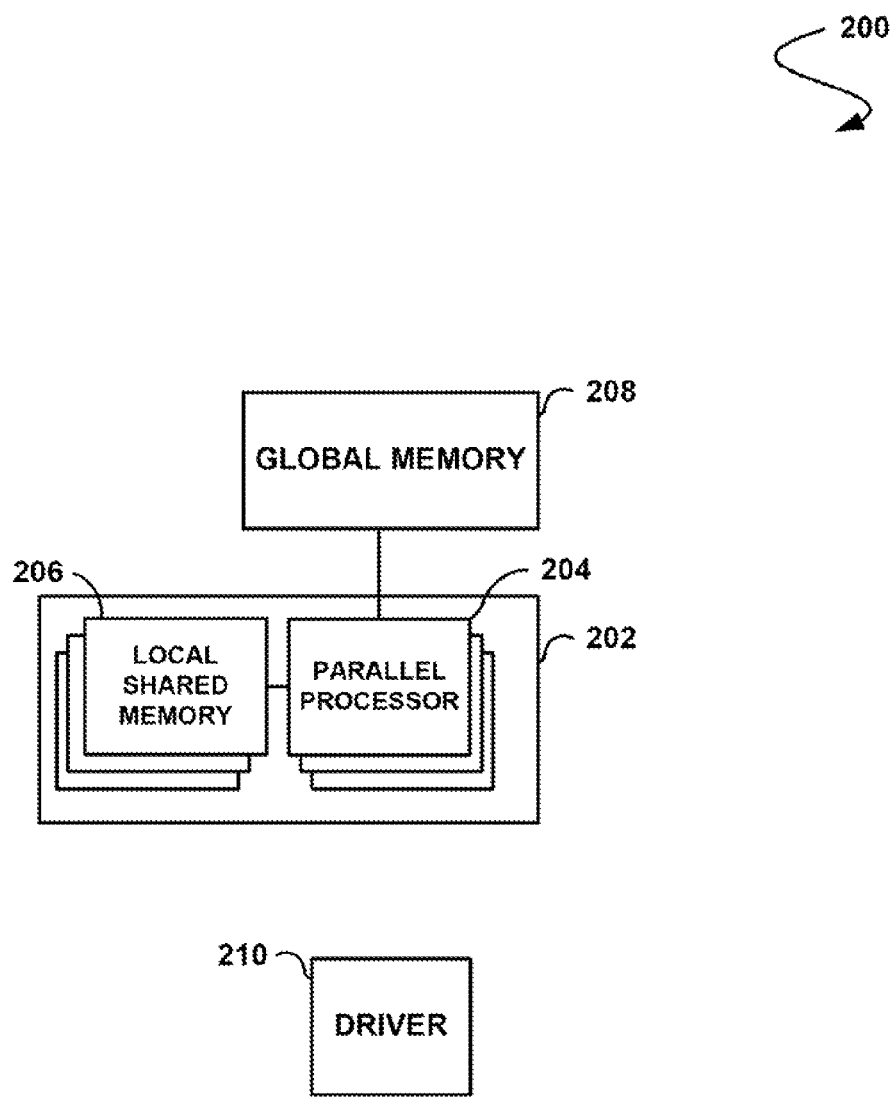
FIG. 2 shows a system for performing a scan operation on a sequence of single-bit values, in accordance with one embodiment of the present invention.

FIG. 2 shows a system 200 for performing a scan operation on a sequence of single-bit values, in accordance with one embodiment of the present invention. As an option, the present system may be implemented to carry out the method of FIG. 1. Of course, however, the present system may be implemented in any desired environment. It should also be noted that the aforementioned definitions may apply during the present description.

As shown, a parallel processing architecture 202 is provided. Such parallel processing architecture includes a plurality of parallel processors 204. While not shown, such parallel processors may be capable of operating on a predetermined number of threads. To this end, each of the parallel processors may operate in parallel, while the corresponding threads may also operate in parallel.

In one embodiment, the parallel processing architecture may include one or more single instruction multiple data (SIMD) processing elements. In such a system, the threads being executed by the processor are collected into groups such that at any instant in time all threads within a single group are executing precisely the same instruction but on potentially different data. In one embodiment, this group of threads operating in such fashion may be referred to as a "warp." Further, the predetermined number of threads in such a group may be referred to as the "warp size" of the corresponding processor.

In another embodiment, the foregoing parallel processing architecture may include a graphics processor or any other integrated circuit equipped with graphics processing capabilities [e.g. in the form of a chipset, system-on-chip (SOC), core integrated with a CPU, discrete processor; etc.]. In still another embodiment, the foregoing parallel processing architecture may include a processor with one or more vector processing elements such as the Cell processor, referring to the Cell Broadband Engine microprocessor architecture jointly developed by Sony®, Toshiba®, and IBM®.

With continuing reference to FIG. 2, the parallel processing architecture may include local shared memory 206. Each of the parallel processors of the parallel processing architecture may read and/or write to its own local shared memory. This shared memory may consist of physically separate memories associated with each processor or it may consist of separately allocated regions of one or more memories shared amongst the processors. Further, in the illustrated embodiment, the shared memory may be embodied on an integrated circuit on which the processors of the parallel processing architecture are embodied.

Still yet, global memory 208 is shown to be included. In use, such global memory is accessible to all the processors of the parallel processing architecture. As shown, such global memory may be embodied on an integrated circuit that is separate from the integrated circuit on which the processors of the aforementioned parallel processing architecture are embodied. While the parallel processing architecture is shown to be embodied on the various integrated circuits of FIG. 2 in a specific manner, it should be noted that the system components may or may not be embodied on the same integrated circuit, as desired.

Still yet, the present system of FIG. 2 may further include a driver 210 for controlling the parallel processing architecture, as desired. In one embodiment, the driver may include a library, for facilitating such control. For example, such library may include a library call that may instantiate the functionality set forth herein.

Further, in another embodiment, the driver may be capable of providing general computational capabilities utilizing the parallel processing architecture (e.g. a graphics processor, etc.). An example of such a driver may be provided in conjunction with the CUDA™ framework provided by NVIDIA Corporation. In use, the driver may be used to control the parallel processing architecture to operation in accordance with the method of FIG. 1.

Figure 3:
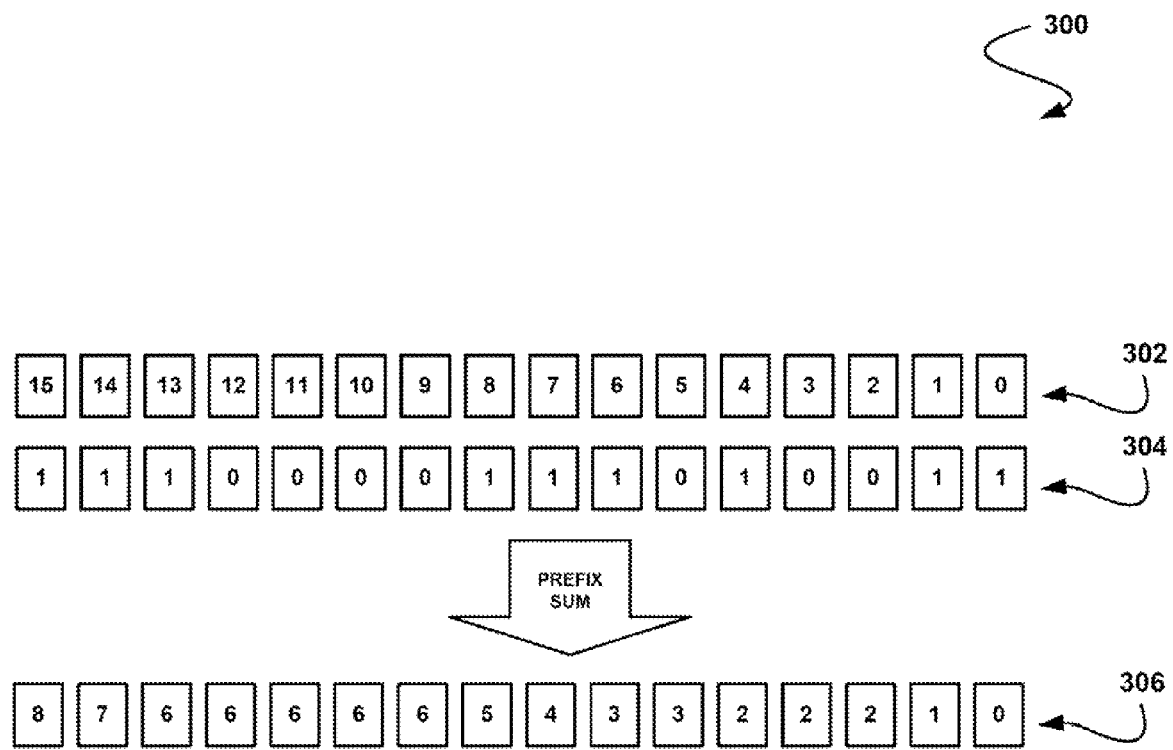
FIG. 3 shows the result of a system for performing a scan operation on a sequence of single-bit values, in accordance with one embodiment of the present invention.

FIG. 3 shows the result of a system 300 for performing a scan operation using a parallel processing architecture to single-bit inputs, in accordance with one embodiment of the present invention. As an option, the present system may be implemented in the context of the details of FIGS. 1-2. Of course, however, the present system may be implemented in any desired environment. It should also be noted that the aforementioned definitions may apply during the present description.

As shown, a plurality of processing elements 302 included as part of a parallel processor architecture are provided. The processing elements (e.g. threads) each possess a 1-bit value 304. In one embodiment, these 1-bit values may be derived from evaluating a logic expression, in this case, the 1-bit values may be referred to as predicate bits.

In operation, a scan operation instruction may be received by the parallel processor architecture. In this case, the scan may include a prefix sum scan operation instruction. In response to the scan operation instruction, the prefix sum scan operation instruction may be performed using the parallel processor architecture with the plurality of processing elements.

The result of the prefix sum scan operation (in the example of the figure, an exclusive scan) of the predicate bit inputs across a group of N processing elements (i.e. a warp), results in integers of log (N) bits. FIG. 3 shows a result 306 of a scan for a warp of N=16 processing elements (e.g. threads). Of course, any number of processing elements may be utilized in various embodiments. It should be noted that the value delivered to processing element "i" is the number of processing elements (e.g. threads) with a smaller index for which the given predicate bits were 1. In various embodiments, this operation may be used as the basis for a number of computational kernels, such as stream compaction and radix sorting.

In some cases, a fully general scan operation may not be amenable to direct hardware implementation. For example, the scan operation may involve dealing with sequences of arbitrary length, and with many possible numeric types (e.g., int, float, short, etc.). In contrast a binary scan primitive on small sequences of fixed length may be implemented in hardware and provided as a machine instruction. The number of processing elements in a multiprocessor is a known architectural constant, and numeric types may be held constant to 1-bit values.

Figure 4:
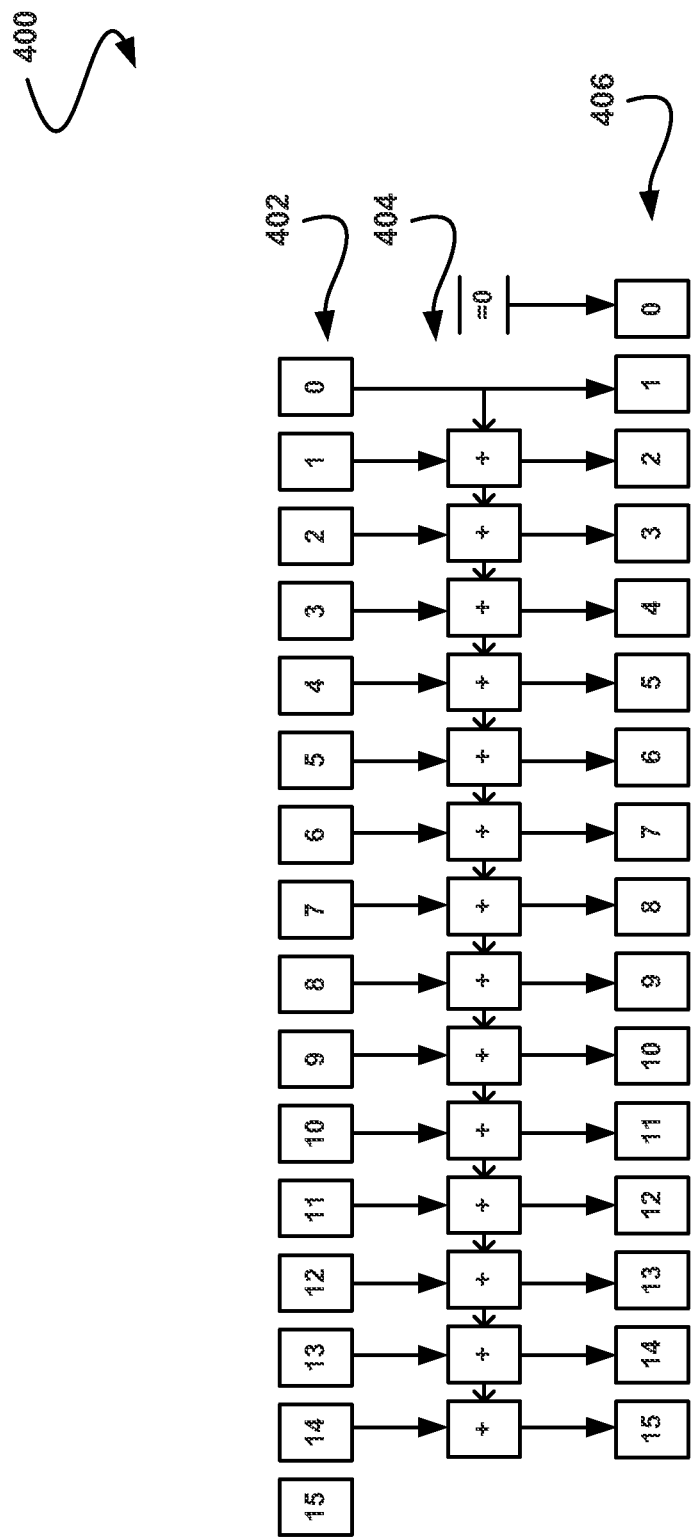
FIG. 4 shows a system for performing a scan operation in hardware using a parallel processing architecture, in accordance with one embodiment of the present invention.

FIG. 4 shows a system 400 for performing a scan operation in hardware using a parallel processing architecture, in accordance with one embodiment of the present invention. As an option, the present system may be implemented in the context of the details of FIGS. 1-3, Of course, however, the present system may be implemented in any desired environment. Again, the aforementioned definitions may apply during the present description.

As shown, a plurality of processing elements 402 included as part of a parallel processor architecture are provided. Additionally, a plurality of adders 404 are included. Such adders may include any circuit or device capable of adding numbers.

In operation, the processing elements (e.g. threads) may each hold a 1-bit value. Thus, when a scan operation instruction is received by the plurality of processing elements, the scan operation Instruction may be performed using the parallel processor architecture with the plurality of processing elements. In this case, the collection of adders 404 form an addition network (e.g., circuit) which accepts 1-bit input values from each of the processing elements 402 and delivers the results of the scan operation to each of the processing elements 406.

Although FIG. 4 is illustrated with 16 processing elements, it should be noted that any number of processing elements may be utilized. Additionally, the system in FIG. 4 is illustrated as a system to perform an exclusive scan. In another embodiment, the system may be configured to perform inclusive scans.

Furthermore, the system of FIG. 4 is configured with a depth equal to the number of processing elements (N). In various other embodiments, the system may be configured to minimize the depth. Such minimization may be accomplished utilizing any number of techniques.

Figure 5:
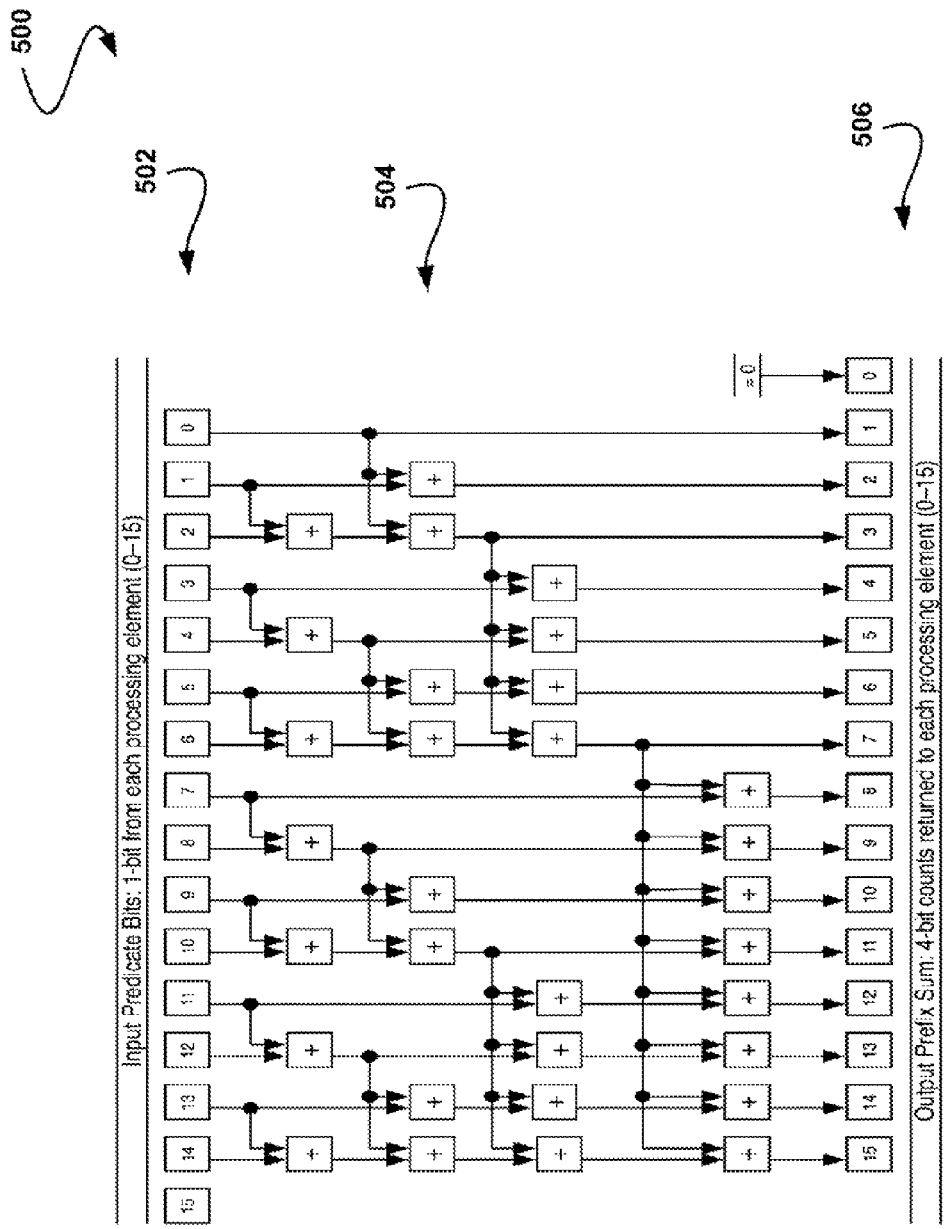
FIG. 5 shows a system for performing a scan operation in hardware using a parallel processing architecture, in accordance with yet another embodiment of the present invention.

FIG. 5 shows a system 500 for performing a scan operation in hardware using a parallel processing architecture, in accordance with another embodiment of the present invention. As an option, the present system may be implemented in the context of the details of FIGS. 1-4. Of course, however, the present system may be implemented in any desired environment. It should also be noted that the aforementioned definitions may apply during the present description.

As shown, a plurality of processing elements 502 included as part of a parallel processor architecture are provided. Additionally, a tree of adders 504 are included. In operation, each processing element 502 contributes a 1-bit input.

As an option, this 1-bit input may be taken from a designated predicate register. These inputs may be fed through the tree of adders, delivering as output the prefix sum values 506 to the corresponding processing elements. In one embodiment, each output may be deposited in a designated data register for each processing element.

As shown, the addition system formed by the tree of adders 504 has a depth value log (N), where N is the number of processing elements. However, in some cases, it may be desirable to reduce the number of adders in the system. Thus, a system with a reduced number of adders and an increased algorithmic depth may be utilized.

Figure 6:
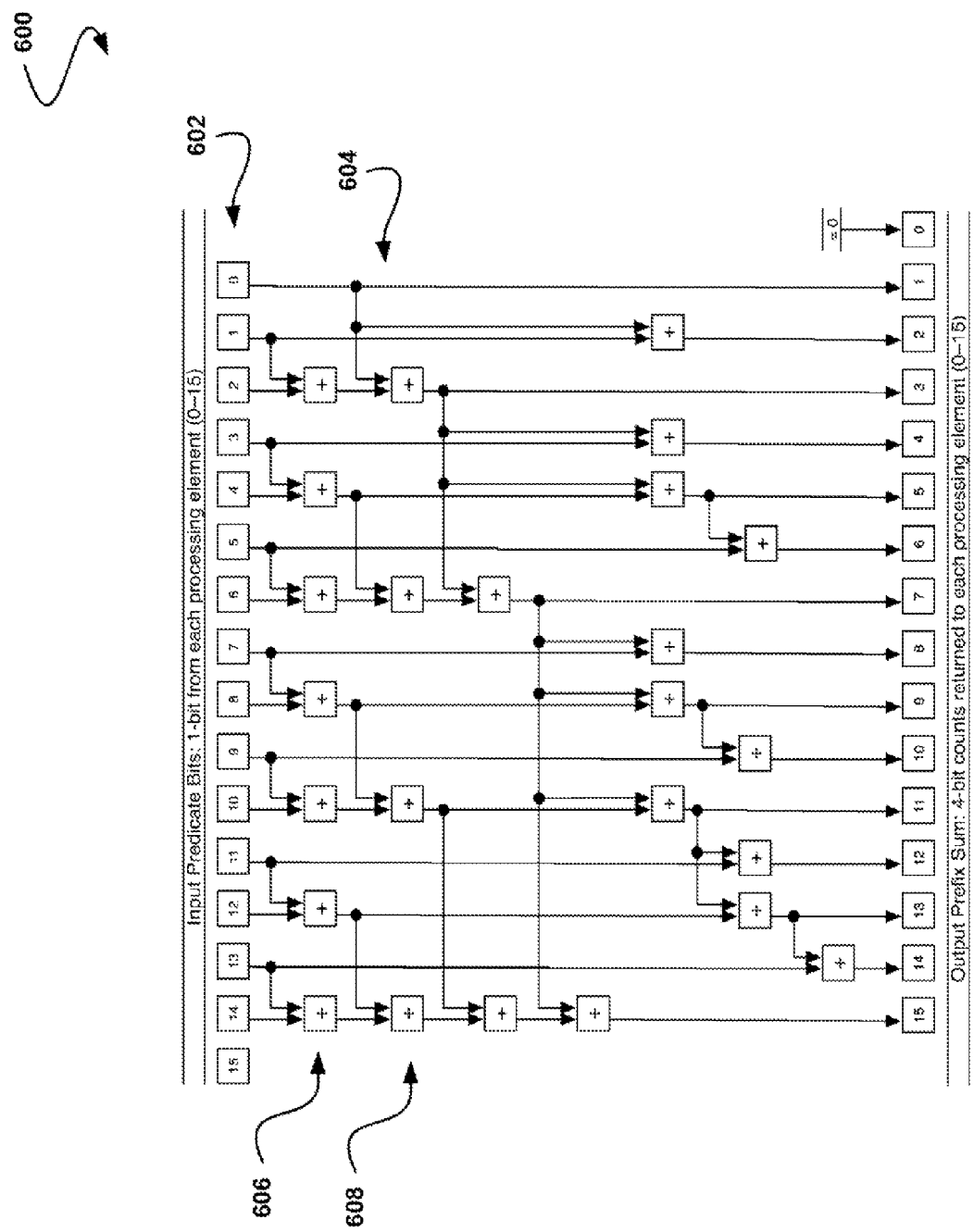
FIG. 6 shows a system for performing a scan operation in hardware using a parallel processing architecture, in accordance with another embodiment of the present invention.

FIG. 6 shows a system 600 for performing a scan operation in hardware using a parallel processing architecture, in accordance with yet another embodiment of the present invention. As an option, the present system may be implemented in the context of the details of FIGS. 1-5. Of course, however, the present system may be implemented in any desired environment. It should also be noted that the aforementioned definitions may apply during the present description.

As shown, a plurality of processing elements 602 included as part of a parallel processor architecture are provided. Additionally, a plurality of adders 604 are included. In operation, each processing element contributes a 1-bit input.

It should be noted that that the depth of the system directly correlates with the latency of the system. Thus, if total area of a system is more of a concern than total latency, a system with a low number of adders may be desirable (e.g. the system of FIG. 6). On the other hand, if latency is more of a concern than total area, a system with a higher number of adders and a lower depth may be desirable (e.g. the system of FIG. 5).

Utilizing either implementation, scanning 1-bit inputs may be much cheaper than scanning than general numbers. For instance, if full 32-bit integers are summed, each of the adders in a system performing the summation would have to be a 32-bit adder. With 1-bit inputs, however, width of each adder is at most log(N), where N is the number of processing elements in a system. In the context of the present description, the width of an adder refers to the maximum number of bits that the input numbers able to be handled by the adder may contain.

In the specific case and context of FIG. 6, each adder would encounter at most 4 bits per input. In one embodiment, adders of different width may be utilized at different levels in a tree of adders. For example, the adders in $1^{st}$ level 606 of the tree (i.e. immediately below the inputs) may include only 1-bit inputs. Additionally, the $2^{nd}$ level 60S may include only 2-bit inputs.

Given a data path as described in the context of FIGS. 2-6, a binary scan across processing elements of a SIMP multi-processor may be exposed to programs as a machine instruction. In one embodiment, a Predicate Scan instruction ("PSCAN") that takes as input a 1-bit predicate in a register ("Rpred") from each processing element and returns the appropriate prefix sum in another register ("Rsum") to each processing element may be utilized. Such instruction is shown in Table 2 below.

TABLE 2

PSCAN Rsum, Rpred

The operation of this instruction corresponds directly to the systems of FIGS. 2-6. Each of the processing elements contributes a predicate bit to the input of the parallel prefix addition network of the system and each receives a single output value.

Most multiprocessor hardware incorporates a mechanism for selectively deactivating processing elements during a computation. This is typically done to allow the nominally SIMD processor array to execute divergent paths of a program. In such situations, deactivated processing elements may be assumed to contribute a "0" to the parallel prefix computation when a "PSCAN" instruction is executed by the active processing elements. In another embodiment, however, a variant of the instruction may be provided where inactive processing elements contribute a "1."

Furthermore, although FIGS. 2-6 were described in the context of additive operations, other operations are equally applicable. For example, the scan operation and adders may be generalized to use any associative operation other than addition. Thus, the scan operation may be performed utilizing a plurality of functional units of the parallel processor architecture.

In this case, the functional units may include adders. Boolean logic operators, arithmetic and logic operators, and various other functional units. Furthermore, as shown, the parallel processor architecture may include a plurality of levels of functional units. In this case, the number of the levels may be less than a number of the processing elements. Furthermore, the number of the levels may often be less than the log of the number of the processing elements.

In the context of machine instructions, instructions such as AND, OR, and XOR may be utilized similar to the addition instruction. Additionally, for 1-bit inputs, operations such as MIN, MAX, and multiplication may be reduced to these 3 aforementioned 1-bit operations. As noted above, the data path for such instructions would look identical to those shown for FIGS. 3-6, with the constituent adder blocks replaced by the appropriate AND/OR/XOR gates. Additionally, in one exemplary embodiment the systems described in the context of FIGS. 3-6 may be implemented in a pipeline configuration. In this case, latches may be utilized to implement such pipeline configuration.

It should be noted that the machine instructions corresponding to the scan operation instruction may be implemented utilizing a variety of computer programming languages (e.g. C, C++, etc.). In one embodiment, the instruction implemented utilizing a language such as Compute Unified Device Architecture (CUDA™) C as a simple intrinsic. For example, Table 3 shows an instruction in CUDA™ C, where "i" is represents the thread index.

TABLE 3

```
int sum_i = PSCAN(A[i] < pivot);
```

Another approach to exposing this functionality is to implicitly perform binary prefix sum over the "active" bits of the processing elements, rather than a predicate explicitly computed by the program. An example of this construction is shown in Table 4 below.

TABLE 4

```
if( A[i] < pivot )
{
    sum_i = PSCAN_active( );
}
```

In this case, an underlying processor mechanism may be present for a compiler to utilize in order to access the "active" state of the multiprocessor.

Of course, this is only one possible approach to exposing a primitive in a higher level language and is specifically relevant to CUDA™ C. Other means of exposing the primitive machine support are considered. It should be noted that languages with substantially different designs (e.g. Data Parallel C, etc.) will utilize different language-level embodiments.

In one embodiment, one or more groups of processing elements or threads (e.g. a warp) may execute together in a Cooperative Thread Array (CTA), Thus, the parallel processor architecture may provide for coordination among the processing elements. In this case, the coordination may include coordination as to a destination of results that are written. In one embodiment, the plurality of processing elements may be able to communicate with each other via on-chip shared memory and synchronize via barriers.

When performing a scan across a CTA composed of multiple threads, two levels of scan may be performed. The first scan may occur within each warp. As an option, the first scan may be implemented with the "PSCAN" primitive as noted above. The second scan may receive a single value from each warp, and perform a scan over these partial sums. It should be noted that these are all 5-bit integers in the case of a warp width of 32.

In one embodiment, a 1-bit scan primitive may be utilized to compute the prefix sum of a multi-bit number by performing the scan over each binary digit independently and then summing the results, in other words, the parallel processor architecture may perform the scan operation on a multiple-bit value by individually performing a scan of individual bits of the multiple-bit value and summing results of the individual scans after bit-shifting the results. For example, suppose each thread in a warp is given a 5-bit value "x_i." The prefix sum of these values may be computed as shown in Table 5.

TABLE 5

```
int sum_i = PSCAN(x_i & 1 );
    sum_i += PSCAN(x_i & 2 ) << 1;
    sum_i += PSCAN(x_i & 4 ) << 2;
    sum_i += PSCAN(x_i & 8 ) << 3;
    sum_i += PSCAN(x_i & 16) << 4;
```

The result of this implementation would be the same as an implementation with a full scan kernel. However, assuming that "PSCAN" utilizes a single instruction to execute, this can be more efficient than the full kernel when the number of bits in the input values is small. More information regarding scan kernels may be found in patent application Ser. No. 11/862,938 titled "SYSTEM, METHOD AND COMPUTER PROGRAM: PRODUCT FOR PERFORMING A SCAN OPERATION" filed Sep. 27, 2007, which is herein incorporated by reference in its entirety.

It should be noted that the above functionality may be utilized in any desired environment including a parallel processing architecture and may be implemented in various situations where the construction of efficient parallel kernels is desired. For example, suppose that a queue of items correspond to data is being maintained and that a warp of threads writes up to 1 item per thread into the queue. If every thread always writes 1 item, then each thread will always know in advance what offset from the queue pointer should be written as a value.

However, if each individual thread chooses whether to write a value or not, all threads in the warp must compute the appropriate offset at which to write their values. Computing this offset may be implemented using a scan over the predicate which determines whether each thread wishes to write. This computation can be expressed simply and efficiently using the binary scan primitive as illustrated in Table 6.

TABLE 6

```
__device__ void maybe_write(int *queue, int x, bool should_write)
{
    unsigned int i = PSCAN(should_write);
    if( should_write ) queue[i] = x;
}
```

A more compact variant may be produced by implicitly scanning the processor "active" bits across the warp. For example, one such variant is shown in Table 7 below.

TABLE 7

```
__device__ void maybe_write(int *queue, int x, bool should_write)
{
    if( should_write ) queue[PSCAN_active( )] = x;
}
```

As another example, a CTA of threads may be controlling a sequence of numbers with one value per thread. In this example, a "pivot" value may be selected and an array may be reshuffled such that all values in the array that are less than the pivot come before all other numbers. This is a step in algorithms such as Quicksort, for example.

To implement this operation, a "rank()" primitive may be defined that accepts a predicate "p." Threads for which the predicate is true will receive a count of the number of threads with lower thread index for which the predicate is true. Threads for which the predicate is false will receive a count of the number of threads with a lower thread index for which the predicate is false, plus the total, number of true predicates. Table 8 shows an example of a representative function in CUDA™, where the function "cta_prefix_sum()" is built on top of intra-warp scans in the manner set forth in patent application Ser. No. 11/862,938 titled "SYSTEM, METHOD AND COMPUTER PROGRAM PRODUCT FOR PERFORMING A SCAN OPERATION" filed Sep. 27, 2007.

TABLE 8

```
__device__ unsigned int rank(bool p)
{
    __shared__ bool smem[ctasize];
    smem[threadIdx.x] = p;
    __syncthreads( );
```

TABLE 8-continued

```
    bool last_p = smem[ctasize-1]; // Everybody gets last value
    __syncthreads( );
    cta_prefix_sum(smem);          // Uses PSCAN. See also
P003535.
    // (1) total number of True threads
    unsigned int ntrue = last_p + smem[ctasize-1];
    // (2) Compute this thread's rank within ordering
    unsigned int r = (p) ? smem[threadIdx.x]
        ; ntrue + threadIdx.x - smem[threadIdx.x];
    return r;
}
```

Given such a primitive, a partitioning function may be written. For example, Table 9 shows and example of one such partitioning function.

TABLE 9

```
__global__ void partition(unsigned int *v, const unsigned int pivot)
{
    unsigned int v_i = v[threadIdx.x];
    __syncthreads( ); // make sure everyone is ready to write
    unsigned int j = rank(v_i<pivot);
    v[j] = v_i;
}
```

Similar to partitioning, sorting sequences of numbers is another operation that is useful in many applications. It is also easily implemented in terms of the "rank()" primitive defined above. Each pass of a radix sort is simply a reshuffling in the manner of "partition()" based on the value of a single bit of the data values, rather than, based on a comparison predicate. In the context of the present description, a radix sort is a sorting algorithm that sorts integers by processing individual digits. One example of an implementation utilizing a radix sort is shown in Table 10.

TABLE 10

```
__device__ void cta_radix_sort(unsigned int *v)
{
    for(unsigned int shift=0; shift<32; ++shift)
    {
        unsigned int v_i = v[threadIdx.x];
        __syncthreads( );
        unsigned int lsb = (v_i >> shift) & 0x1;
        unsigned int r = rank(!lsb);
        v[r] = v_i;
        __syncthreads( ); // make sure everyone wrote
    }
}
```

While various embodiments have been described, above, it should be understood that they have been presented by way of example only, and not limitation. For example, in various other embodiments, any number of scanning algorithms may be utilized and implemented in the context and details of the preceding figures.

Figure 7:
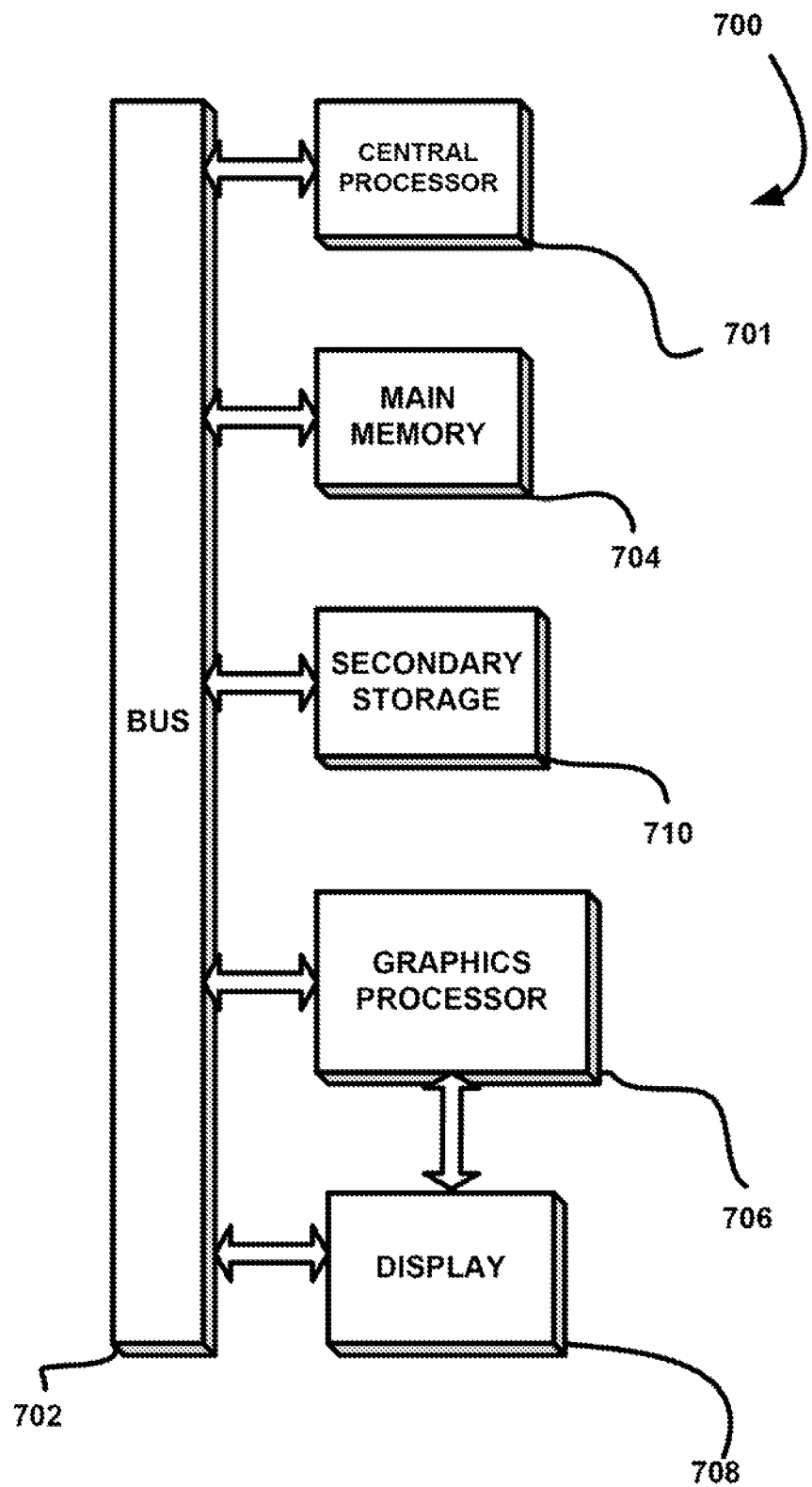
FIG. 7 illustrates an exemplary system in which the various architecture and/or functionality of the various previous embodiments may be implemented.

FIG. 7 illustrates an exemplary system 700 in which the various architecture and/or functionality of the various previous embodiments may be implemented. As shown, a system is provided including at least one host processor 701 which is connected to a communication bus 702. The system also includes a main memory 704. Control logic (software) and data are stored in the main memory which may take the form of random access memory (RAM).

The system also includes a graphics processor 706 and a display 708, i.e. a computer monitor. In one embodiment, the graphics processor may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system may also include a secondary storage 710. The secondary storage includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory and/or the secondary storage. Such computer programs, when executed, enable the system to perform various functions. Memory, storage and/or any other storage are possible examples of computer-readable media.

In one embodiment, the architecture and/or functionality of the various previous figures may be implemented in the context of the host processor, graphics processor, an integrated circuit (not shown) that is capable of at least a portion of the capabilities of both the host processor and the graphics processor, a chipset (i.e. a group of integrated circuits designed to work and sold as a unit for performing related functions, etc.), and/or any other integrated circuit for that matter. Further, the element assignment functionality of the various previous figures may, in one possible embodiment, be implemented in any of the foregoing integrated circuits, under the control of a driver 712.

Still yet, the architecture and/or functionality of the various previous figures may be implemented in the context of a general computer system, a circuit board system, a game console system dedicated for entertainment purposes, an application-specific system, and/or any other desired system. For example, the system may take the form of a desktop computer, lap-top computer, and/or any other type of logic. Still yet, the system may take the form of various other devices including, but not limited to a personal digital assistant (PDA) device, a mobile phone device, a television, etc.

Further, while not shown, the system may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving a scan operation instruction; and
   in response to the scan operation instruction, performing a scan operation on a sequence of single-bit values using a parallel processor architecture with a plurality of processing elements;
   wherein each of the plurality of processing elements hold a single-bit value of the sequence of single-bit values;

wherein the plurality of processing elements includes a first set of processing elements, a second set of processing elements, and a tree of adders that receives input from the first set of processing elements and delivers results to the second set of processing elements.

2. The method of claim 1, wherein the scan operation includes a prefix sum scan operation.

3. The method of claim 1, wherein the scan operation includes an inclusive scan operation.

4. The method of claim 1, wherein the scan operation includes an exclusive scan operation.

5. The method of claim 1, wherein the parallel processor architecture provides for coordination among the processing elements.

6. The method of claim 5, wherein the coordination includes coordination as to a destination of results that are written.

7. The method of claim 1, wherein the processing elements each execute a plurality of threads in parallel.

8. The method of claim 1, wherein the scan operation is performed utilizing a plurality of functional units of the parallel processor architecture.

9. The method of claim 8, wherein the functional units include Boolean logic operators.

10. The method of claim 8, wherein the functional units include arithmetic and logic operators.

11. The method of claim 8, wherein the parallel processor architecture includes a plurality of levels of functional units.

12. The method of claim 11, wherein a number of the levels is less than a number of the processing elements.

13. The method of claim 11, wherein a number of the levels is less than a log of a number of the processing elements.

14. The method of claim 1, wherein the parallel processor architecture performs the scan operation on a multiple-bit value by individually performing a scan of individual bits of the multiple-bit value and summing results of the individual scans after bit-shifting the results.

15. The method of claim 1, wherein the parallel processor architecture includes one or more single instruction multiple data processors.

16. The method of claim 1, wherein the parallel processor architecture includes a graphics processor.

17. The method of claim 1, wherein each of the plurality of processing elements includes a thread.

18. The method of claim 1, wherein the scan operation includes a predicate scan operation that takes as an input a single-bit predicate from a register of each processing element of the plurality of processing elements and returns a prefix sum in another register to each processing element.

19. The method of claim 1, wherein each adder at a first level of the tree of adders includes a single-bit input from a predicate register of a corresponding processing element of the first set of processing elements, each adder at a second level of the tree of adders includes a two-bit input, and each result from the tree of adders is delivered to a designated data register of each processing element of the second set of processing elements.

20. A computer program product embodied on a computer readable non-transitory medium, comprising:
    computer code for performing a scan operation on a sequence of single-bit values using a parallel processor architecture with a plurality of processing elements, in response to a scan operation instruction;
    wherein each of the plurality of processing elements hold a single-bit value of the sequence of single-bit values;
    wherein the plurality of processing elements includes a first set of processing elements, a second set of processing elements, and a tree of adders that receives input from the first set of processing elements and delivers results to the second set of processing elements.

21. An apparatus, comprising:
    a parallel processor architecture including a plurality of processing elements; and
    an instruction for performing a scan operation on a sequence of single-bit values using the parallel processor architecture;
    wherein each of the plurality of processing elements hold a single-bit value of the sequence of single-bit values;
    wherein the plurality of processing elements includes a first set of processing elements, a second set of processing elements, and a tree of adders that receives input from the first set of processing elements and delivers results to the second set of processing elements.

22. The apparatus of claim 21, wherein the parallel processor architecture remains in communication with memory and a display via a bus.

* * * * *